US009166860B2

(12) United States Patent
Kim et al.

(10) Patent No.: US 9,166,860 B2
(45) Date of Patent: Oct. 20, 2015

(54) PAYLOAD FOR MULTI-INPUT MULTI-OUTPUT

(75) Inventors: Joon Bae Kim, Lexington, MA (US); Vladimir Oksman, Morganville, NJ (US)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

(21) Appl. No.: 13/439,072

(22) Filed: Apr. 4, 2012

(65) Prior Publication Data

US 2013/0094517 A1    Apr. 18, 2013

Related U.S. Application Data

(60) Provisional application No. 61/472,113, filed on Apr. 5, 2011.

(51) Int. Cl.
| | | |
|---|---|---|
| H04J 3/24 | (2006.01) | |
| H04L 29/02 | (2006.01) | |
| H04L 1/00 | (2006.01) | |
| H04L 1/04 | (2006.01) | |
| H04L 1/06 | (2006.01) | |
| H04L 1/08 | (2006.01) | |
| H04B 3/54 | (2006.01) | |
| H04L 5/00 | (2006.01) | |
| H04L 27/26 | (2006.01) | |

(52) U.S. Cl.
CPC ............. *H04L 29/02* (2013.01); *H04B 3/542* (2013.01); *H04L 1/0071* (2013.01); *H04L 1/04* (2013.01); *H04L 1/06* (2013.01); *H04L 1/08* (2013.01); *H04L 5/0023* (2013.01); *H04L 5/0044* (2013.01); *H04L 27/2602* (2013.01); *H04B 2203/5408* (2013.01); *H04B 2203/5416* (2013.01)

(58) Field of Classification Search
None
See application file for complete search history.

(56) References Cited

U.S. PATENT DOCUMENTS

| | | | | |
|---|---|---|---|---|
| 2008/0240262 A1* | 10/2008 | Wong | | 375/260 |
| 2008/0310531 A1* | 12/2008 | Bai et al. | | 375/260 |
| 2009/0279421 A1* | 11/2009 | Wang et al. | | 370/210 |
| 2010/0271991 A1* | 10/2010 | Kimura et al. | | 370/310 |
| 2012/0008610 A1* | 1/2012 | Hansen et al. | | 370/338 |
| 2012/0008643 A1* | 1/2012 | Zhang et al. | | 370/474 |
| 2012/0051307 A1* | 3/2012 | Huang et al. | | 370/329 |
| 2012/0057483 A1* | 3/2012 | Kim et al. | | 370/252 |
| 2012/0120935 A1* | 5/2012 | Webster et al. | | 370/338 |
| 2013/0230126 A1* | 9/2013 | Zhang et al. | | 375/340 |

\* cited by examiner

*Primary Examiner* — Otis L Thompson, Jr.

(57) ABSTRACT

Described herein are implementations related to data communication using a frame that includes at least two data packets. In one implementation, a first of the data packets includes at least a payload with repeated payload portions to increase diversity gain. A second of the data packets includes at least a payload with repeated payload portions to increase diversity gain. The repeated payload portions of the second data packet are shuffled or rotated in relation to the repeated data payload portions of the first data packet. In one implementation, the frame is conveyed in a Power Line Communication (PLC) system.

16 Claims, 7 Drawing Sheets

PAYLOAD FOR MULTI-INPUT MULTI-OUTPUT

RELATED APPLICATION

This application claims the benefit of priority to U.S. Provisional Patent Application Ser. No. 61/472,113, filed on 5 Apr. 2011, the disclosure of which is incorporated by reference herein.

BACKGROUND

Data packet transmission in multipoint-to-multipoint networks (e.g., ad-hoc or mesh networks) is usually arranged by sending one or more data packets. A data packet is often encoded and modulated. Also, a data packet typically includes at least one frame. Each frame is preceded by a preamble. The primary purposes of the preamble include 1) enabling the receiver of the frame to detect the frame on the transmission medium, 2) adjusting the gain of the receiver (e.g., an analog front end (AFE)) and synchronizing the clock so that frame is received when expected. The frame also has a header that carries information helping the receiver to address, demodulate, and decode the frame. The preamble and header are generally followed by a payload, which carries data for communication to one or more receivers.

Because of their ubiquitous nature, powerlines are increasing in popularity as a transmission medium for many networks that use data packet transmission techniques. For example, Power Line Communication (PLC), also called Mains Communication, Power Line Transmission (PLT), Broadband Powerline (BPL), Powerband or Power Line Networking (PLN), is a term describing several different systems for using power distribution wires for simultaneous distribution of data. PLC systems can communicate voice and data by superimposing a signal(s) over standard 50 or 60 Hz alternating current (AC). For indoor applications, PLC equipment can use household electrical power wiring as a transmission medium.

Most AC power outlets have 3 connections, phase (P), neutral (N), ground (G). A PLC system can utilize two independent channels provided by these three connections (e.g., P-N pair for one channel and N-G pair for another channel). Utilizing more than two channels is also possible. Without loss of generality, only two channels are assumed in this disclosure for the simplicity of description and illustration.

A Single-Input Single-Output (SISO) PLC system often utilizes P-N pair for its communication channel because of its ubiquitous availability. However, emerging PLC Multi-Input Multi-Output (MIMO) technology takes advantage of the remaining communication channel(s) to increase spectral efficiency and throughput.

Most deployed SISO PLC modems provide a payload repetition scheme that effectively repeats payload blocks in frequency and time to increase the robustness when the channel characteristics are unknown. However, such a SISO payload repetition does not effectively translate to MIMO PLC modems and systems, as the application of the SISO payload repetition scheme would result in undesirable correlation of payloads.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

Described herein are implementations related to data communication using a frame that includes at least two data packets. In one implementation, a first of the data packets includes at least a payload with repeated payload portions to increase diversity gain. The repeating of payload portions is especially advantageous when conditions of the channels are unknown or unpredictable. A second of the data packets includes at least a payload with repeated payload portions to increase diversity gain. The repeated payload portions of the second data packet are shuffled or rotated in relation to the repeated data payload portions of the first data packet. In one implementation, the frame is conveyed in a Power Line Communication (PLC) system.

The described implementations are particularly useful in systems that employ Multi-Input Multi-Output (MIMO). In particular, the various frame implementations described herein enable a receiver of an implementation specific frame to reliably receive payload data, due to the uncorrelated nature of the payload data, on the channels of a MIMO system. In addition, the frames implemented by the described implementations are compatible with Single-Input Single-Output (SISO) systems, support various MIMO schemes, e.g., space time diversity and spatial multiplexing, and enable simplified transceiver design.

Exemplary Implementation and Operation

An Orthogonal Frequency-Division Multiplexing (OFDM) is often used as a digital multi-carrier modulation approach for various communications media. OFDM-based networking/transmission systems utilize multiple subcarriers to transport information from one particular node to another. OFDM is sometimes referred to as multi-carrier or discrete multi-tone modulation. An OFDM-based system divides a high-speed serial information signal into multiple lower-speed sub-signals that the system transmits simultaneously at different frequencies in parallel.

The approach is orthogonal because of the spacing which prevents the demodulators from seeing frequencies other than their own. The benefits of OFDM are high spectral efficiency, resiliency to radio frequency (RF) interference, and lower multipath distortion. This is useful because in a typical terrestrial broadcasting scenario there are multipath-channels (i.e., the transmitted signal arrives at the receiver using various paths of different length).

Figure 1:
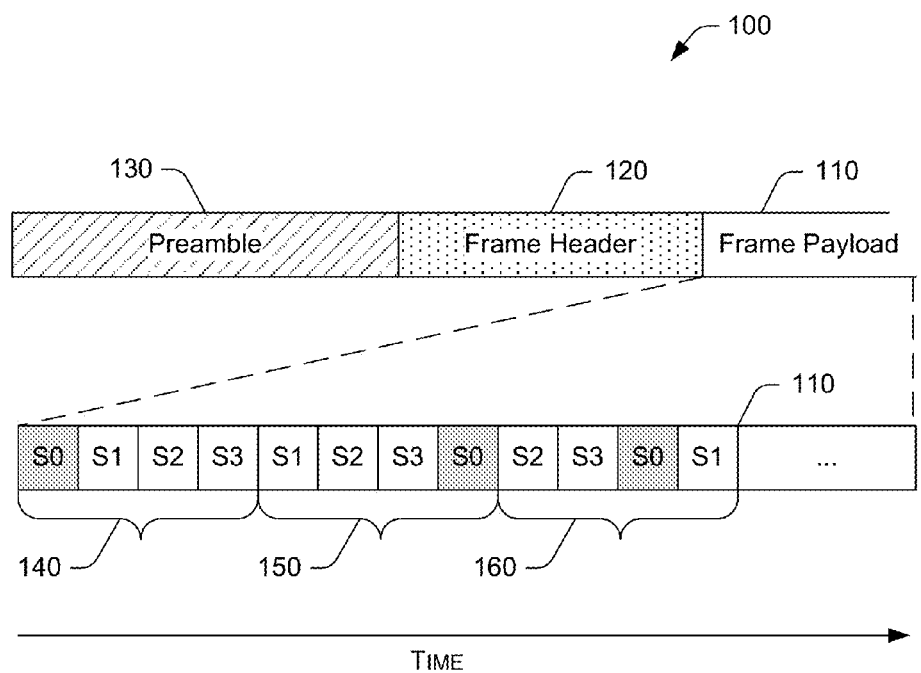
FIG. 1 illustrates a relevant portion of a typical data packet (including a preamble) used in multicarrier communications system, such as an Orthogonal Frequency-Division Multiplexing (OFDM) based system, that uses Single-Input Single-Output (SISO).

FIG. 1 illustrates a relevant portion of a typical data packet 100 used in an OFDM-based system that uses SISO. The data packet 100 includes a frame that includes its payload 110 with a header 120. A preamble 130 is prepended to or associated with the frame.

The preamble 130 is the first part of the frame, and intended so that the receiver can detect the presence of the frame on the medium, adjust the gain of Analog Front End (AFE), and synchronize the clock. The header 120 carries necessary information for the receiver to address, demodulate, and decode the payload 110.

The payload 110 may be comprised of multiple symbols 140, 150 and 160. Three symbols 140, 150 and 160 are shown, but greater or fewer symbols may be implemented in the payload 110. Each of the symbols 140, 150 and 160 may include portions or sections, which are denoted by SN, where N equals the section number. Each SN may comprise data in bits, or any other unit of information (e.g., kbits, bytes, etc.). Furthermore, the sections associated with each of the symbols 140, 150 and 160 may comprise a codeword, such as an forward error correction (FEC) codeword, that includes one or more sections SN.

In the example illustrated in FIG. 1, each of the symbols 140, 150 and 160 includes the same sections S0-S3. However, the sections of symbols 150 and 160 are shifted. That is, the sections of symbols 150 and 160 are cyclically shifted in relation of the sections of symbol 140. For example, in symbol 150, the sections have been cyclically shifted by one position in relation to the section positioning of symbol 140. In symbol 160, the sections have been cyclically shifted by two positions in relation to the section positioning of symbol 140. Repeating and shifting the sections S0-S3 provides frequency and time diversity, which decreases the likelihood that data is lost when channel conditions are less than optimal. As those of ordinary skill in the art appreciate, each of the symbols 140-160 may be associated with a unique timeslot and frequency. Alternatively, each of the sections S0-S3 of symbols 140-160 may be associated with a unique timeslot and frequency. This applies to other frames described herein.

The payload repetition scheme illustrated in FIG. 1 is effective in SISO system. However, in MIMO systems, the same payload repetition scheme is less effective, as explained with reference to FIG. 2.

Figure 2:
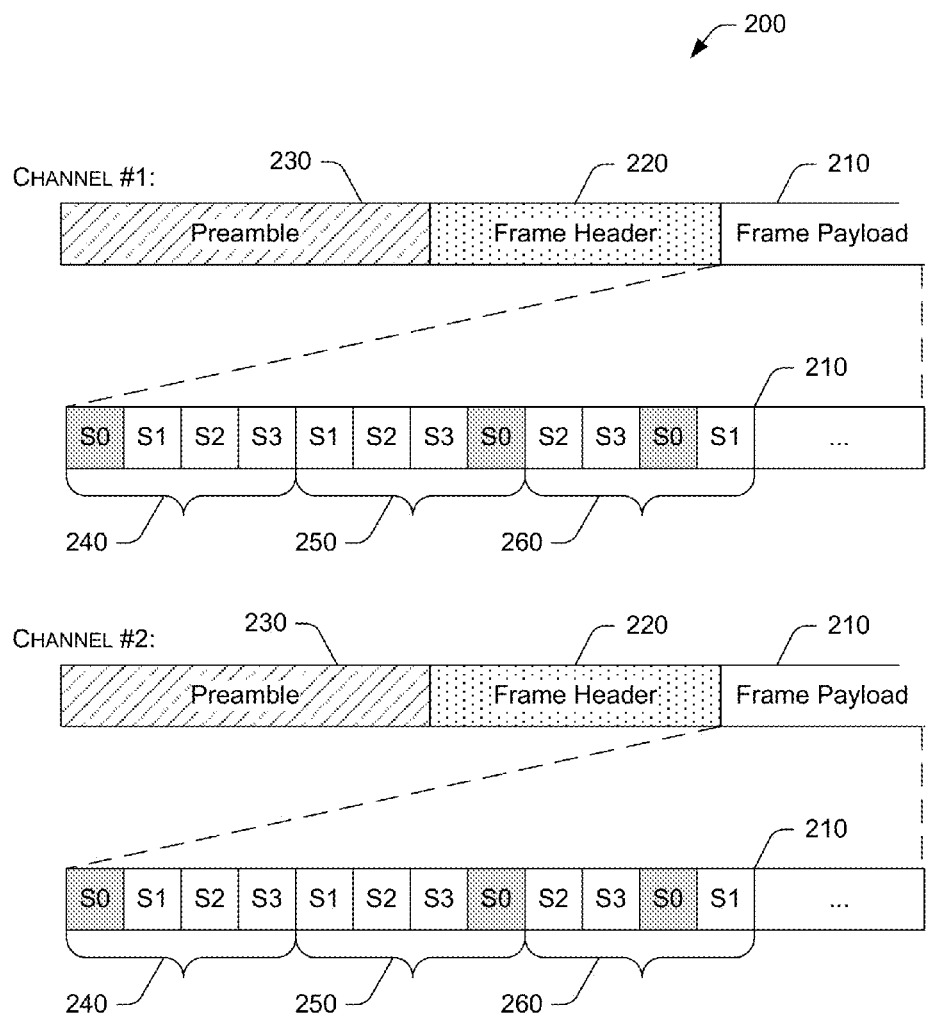
FIG. 2 illustrates a relevant portion of typical data packets used in multicarrier communications system, such as an OFDM-based system, that uses Multi-Input Multi-Output (MIMO).

FIG. 2 illustrates a relevant portion of typical data packets 200 used in an OFDM-based system that uses MIMO. In this disclosure, multiple data packets, such as data packets 200, may be referred to as a MIMO frame or simply a frame. The channel #1 data packet includes a frame that includes a payload 210 with a header 220. A preamble 230 is prepended to or associated with the frame. Similarly, the channel #2 data packet includes a frame that includes its payload 210 with a header 220. A preamble 230 is prepended to or associated with the frame.

The preamble 230 is the first part of the frame, and intended so that the receiver can detect the presence of the frame on the medium, adjust the gain of the AFE, and synchronize the clock. The header 220 carries necessary information for the receiver to address, demodulate, and decode the payload 210.

In a MIMO system, the MIMO frame includes at least two data packets or frames that are transmitted simultaneously over two channels (e.g., channel #1 and #2). In a PLC system, P-N pair may be used channel #1 and N-G pair for channels #2. As indicated previously herein, the present disclosure generally describes MIMO frames that include two data packets. However, the described MIMO frames may also be implemented with more than two data packets in order to accommodate more than two channels.

The payload 210 of the two channels may be comprised of multiple symbols 240, 250 and 260. Three symbols 240, 250 and 260 are shown, but greater or fewer symbols may be implemented in the payload 210. Each of the symbols 240, 250 and 260 may include portions or sections, which are denoted by SN, where N equals the section number. Each SN may comprise data in bits, or any other unit of information (e.g., kbits, bytes, etc.). Furthermore, the sections associated with each of the symbols 240, 250 and 260 may comprise a codeword, such as an forward error correction (FEC) codeword, that includes one or more sections SN.

In the example illustrated in FIG. 2, each of the symbols 240, 250 and 260 includes the same sections S0-S3. However, the sections of symbols 250 and 260 are shifted. That is, the sections of symbols 250 and 260 are cyclically shifted in relation of the sections of symbol 240. For example, in symbol 250, the sections have been cyclically shifted by one position in relation to the section positioning of symbol 240. In symbol 260, the sections have been cyclically shifted by two positions in relation to the section positioning of symbol 240. Repeating and shifting the sections S0-S3 provides frequency and time diversity, which decreases the likelihood that data is lost when channel conditions are less than optimal.

However, in a MIMO system, the correlated nature of the packets 200 on channels 1 and 2 means that impulse noise on a frequency associated with section S0 will likely negatively affect that section on both of the channels 1 and 2. Similarly, impulse noise on a frequency associated with section 51 will likely negatively affect that section on both of channels 1 and 2, and so on.

Implementations described herein provide coordinated MIMO frame structures. The implementations consider at least the following scenarios:
  MIMO frames that are intended to be received by a MIMO receiver.
  MIMO frames intended for different receivers, where such receivers may be SISO or MIMO.
Moreover, the MIMO frames according to various implementations described herein provide:
  Reuse of existing SISO payload repetition schemes (division of smaller blocks, repetition rule on frequency and time, etc.) to prepare repeated payload blocks, although alternate mechanisms may be used as well.
  Backward compatibility with SISO systems with substantially no performance degradation.
  Support of different MIMO schemes, e.g., space time diversity and spatial multiplexing with the same structure.
  Receiver processing time that leads to simplification of receiver design.
  Robustness against random impulse noise.

Figure 3:
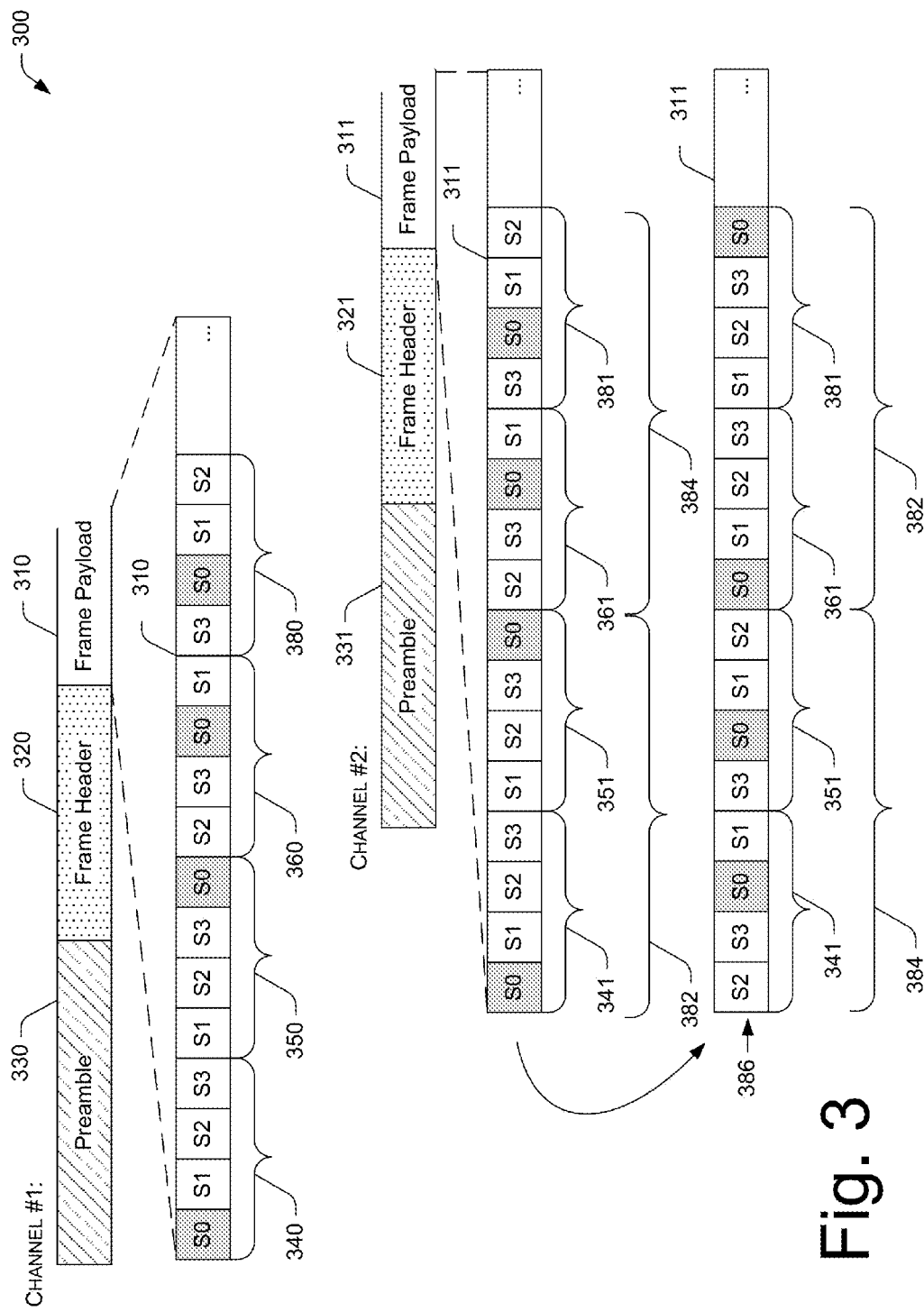
FIG. 3 illustrates a relevant portion of data packets used in multicarrier communications system, such as an OFDM-based system, that uses MIMO, according to a first implementation.

FIG. 3 illustrates a relevant portion of data packets 300 used in an OFDM-based system that uses MIMO, in accordance with a first implementation. The channel #1 data packet includes a frame that includes a payload 310 with a header 320. A preamble 330 is prepended to or associated with the frame. Similarly, the channel #2 data packet includes a frame that includes its payload 331 with a header 321. A preamble 331 is prepended to or associated with the frame.

The preambles 330 and 331 are the first part of the frame, and intended so that the receiver can detect the presence of the frame on the medium, adjust the gain of the AFE, and synchronize the clock. The headers 320 and 321 carry necessary information for the receiver to address, demodulate, and decode the payloads 310 and 311.

In a MIMO system, the MIMO frame includes at least two data packets or frames that are transmitted simultaneously over two channels (e.g., channel #1 and #2). In a PLC system, P-N pair may be used channel #1 and N-G pair for channels #2. As indicated previously herein, the present disclosure generally describes MIMO frames that include two data packets. However, the described MIMO frames may also be implemented with more than two data packets in order to accommodate more than two channels.

The payload 310 of may be comprised of multiple symbols 340, 350, 360 and 380. Four symbols 340, 350, 360 and 380 are shown, but greater or fewer symbols may be implemented in the payload 310. Each of the symbols 340, 350, 360 and 380 may include portions or sections, which are denoted by SN, where N equals the section number. Each SN may comprise data in bits, or any other unit of information (e.g., kbits, bytes, etc.). Furthermore, the sections associated with each of the symbols 340, 350, 360 and 380 may comprise a codeword, such as an forward error correction (FEC) codeword, that includes one or more sections SN. Similarly, the payload 311 may be comprised of multiple symbols 341, 351, 361 and 381 as similarly described with respect to payload 310.

In the example illustrated in FIG. 3, for channel #1, each of the symbols 340, 350, 360 and 380 includes the same sections S0-S3. However, the sections of symbols 340, 350, 360 and 380 are shifted. That is, the sections of symbols 350, 360 and 380 are cyclically shifted in relation of the sections of symbol 340. For example, in symbol 350, the sections have been cyclically shifted by one position in relation to the section positioning of symbol 340. In symbol 360, the sections have been cyclically shifted by two positions in relation to the section positioning of symbol 340. In symbol 380, the sections have been cyclically shifted by three positions in relation to the section positioning of symbol 340. Repeating and shifting the sections S0-S3 provides frequency and time diversity, which decreases the likelihood that data is lost when channel conditions are less than optimal.

Furthermore, in the example illustrated in FIG. 3, for channel #2, each of the symbols 341, 351, 361 and 381 includes the same sections S0-S3. However, the sections of symbols 341, 351, 361 and 381 are shifted, in a similar manner as described in relation to channel #1. That is, the sections of symbols 351, 361 and 381 are cyclically shifted in relation of the sections of symbol 341. For example, in symbol 351, the sections have been cyclically shifted by one position in relation to the section positioning of symbol 341. In symbol 361, the sections have been cyclically shifted by two positions in relation to the section positioning of symbol 341. In symbol 381, the sections have been cyclically shifted by three positions in relation to the section positioning of symbol 341. Repeating and shifting the sections S0-S3 provides frequency and time diversity, which decreases the likelihood that data is lost when channel conditions are less than optimal. Furthermore, as is shown by reference numeral 386, the content 382 from the symbols 341 and 351 has been shifted to symbols 361 and 381, and the content 384 from the symbols 361 and 381 has been shifted to symbols 341 and 351.

The result of the foregoing is that the data packets 300 of channel #1 and channel #2 are uniformly distributed in frequency, time and space. More particularly, the implementation of the data packets 300 in the manner illustrated in FIG. 3 provides a MIMO system with frequency, time and spatial diversity.

Figure 4:
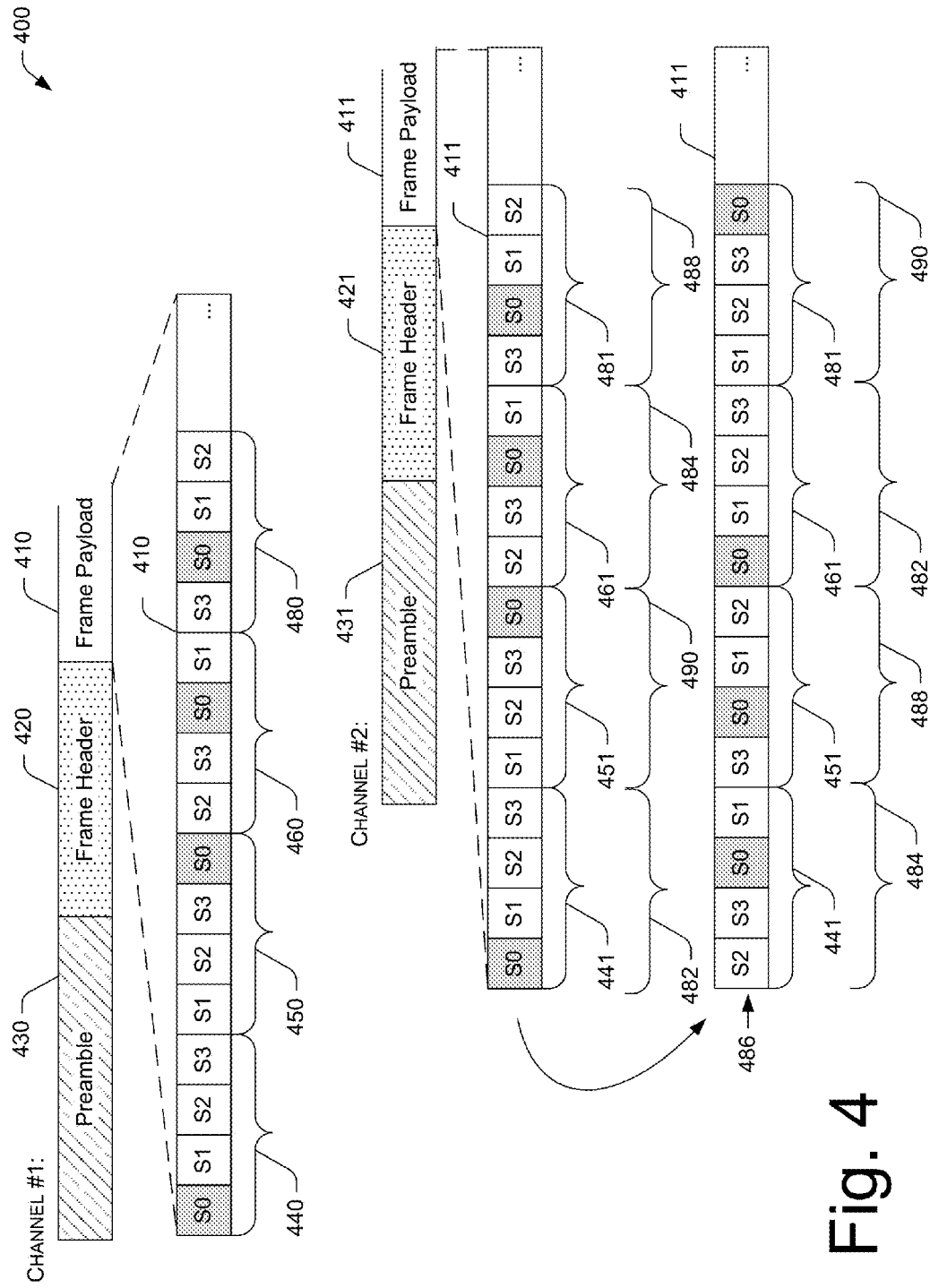
FIG. 4 illustrates a relevant portion of data packets used in multicarrier communications system, such as an OFDM-based system, that uses MIMO, according to a second implementation.

FIG. 4 illustrates a relevant portion of data packets 400 used in an OFDM-based system that uses MIMO, in accordance with a second implementation. The channel #1 data packet includes a frame that includes a payload 410 with a header 420. A preamble 430 is prepended to or associated with the frame. Similarly, the channel #2 data packet includes a frame that includes its payload 411 with a header 421. A preamble 431 is prepended to or associated with the frame.

The preamble 430 is the first part of the frame, and intended so that the receiver can detect the presence of the frame on the medium, adjust the gain of the AFE, and synchronize the clock. The header 420 carries necessary information for the receiver to address, demodulate, and decode the payload 410. The foregoing is true for preamble 431, header 421 and payload 411.

In a MIMO system, the MIMO frame includes at least two data packets or frames that are transmitted simultaneously over two channels (e.g., channel #1 and #2). In a PLC system, P-N pair may be used channel #1 and N-G pair for channels #2. As indicated previously herein, the present disclosure generally describes MIMO frames that include two data packets. However, the described MIMO frames may also be implemented with more than two data packets in order to accommodate more than two channels.

The payload 410 of the two channels may be comprised of multiple symbols 440, 450, 460 and 480. Four symbols 440, 450, 460 and 480 are shown, but greater or fewer symbols may be implemented in the payload 410. Each of the symbols 440, 450, 460 and 480 may include portions or sections, which are denoted by SN, where N equals the section number. Each SN may comprise data in bits, or any other unit of information (e.g., kbits, bytes, etc.). Furthermore, the sections associated with each of the symbols 440, 450, 460 and 480 may comprise a codeword, such as an forward error correction (FEC) codeword, that includes one or more sections SN. Similarly, the payload 411 may be comprised of multiple symbols 441, 451, 461 and 481 as similarly described with respect to payload 310.

In the example illustrated in FIG. 4, for channel #1, each of the symbols 440, 450, 460 and 480 includes the same sections S0-S3. However, the sections of symbols 440, 450, 460 and 480 are shifted. That is, the sections of symbols 450, 460 and 480 are cyclically shifted in relation of the sections of symbol 440. For example, in symbol 450, the sections have been cyclically shifted by one position in relation to the section positioning of symbol 440. In symbol 460, the sections have been cyclically shifted by two positions in relation to the section positioning of symbol 440. In symbol 480, the sections have been cyclically shifted by three positions in relation to the section positioning of symbol 440. Repeating and shifting the sections S0-S3 provides frequency and time diversity, which decreases the likelihood that data is lost when channel conditions are less than optimal.

Furthermore, in the example illustrated in FIG. 4, for channel #2, each of the symbols 441, 451, 461 and 481 includes the same sections S0-S3. However, the sections of symbols 441, 451, 461 and 481 are shifted, in a similar manner as described in relation to channel #1. That is, the sections of symbols 451, 461 and 481 are cyclically shifted in relation of the sections of symbol 441. For example, in symbol 451, the sections have been cyclically shifted by one position in relation to the section positioning of symbol 441. In symbol 461, the sections have been cyclically shifted by two positions in relation to the section positioning of symbol 441. In symbol 481, the sections have been cyclically shifted by three positions in relation to the section positioning of symbol 441. Repeating and shifting the sections S0-S3 provides frequency and time diversity, which decreases the likelihood that data is lost when channel conditions are less than optimal. Furthermore, as is shown by reference numeral 486, content 482 from symbol 441 has been shifted to symbol 461, and content 484 from symbol 461 has been shifted to symbol 441. Also, as is shown by reference numeral 486, content 491 from symbol 451 has been shifted to symbol 481, and content 488 from symbol 481 has been shifted to symbol 451. The example shown here provides greater shifting granularity and shifting alternatives as compared to the example shown in FIG. 3. However, the greater shifting granularity may be increase processing time.

The result of the foregoing is that the data packets 400 of channel #1 and channel #2 are uniformly distributed in frequency, time and space. More particularly, the implementation of the data packets 400 in the manner illustrated in FIG. 4 provides a MIMO system with frequency, time and spatial diversity.

FIGS. 3 and 4 illustrate exemplary implementations that shuffle sections, data blocks or sub-blocks so that repeated data blocks are uniformly distributed in frequency, time, and space. The particular shuffling or circular rotations illustrated and described are provided for illustration purposes only. That is, the actual circular rotation in frequency may be any arbitrary amount that achieves diversity in frequency, time and space.

Exemplary Network Communications Arrangement

An exemplary communication arrangement may employ at least two multicarrier apparatuses or nodes. The exemplary communication arrangement may also employ a multicarrier controller apparatus or controller node. In one implementation, the multicarrier apparatuses/controller are OFDM apparatuses capable of implementing the herein described techniques and implementations. In another implementation, the exemplary communication arrangement employs apparatuses or nodes that communicate via a wired/wireless medium by way of one or more communication protocols.

The multicarrier apparatuses may communicate through a communication channel. The communication channel may be realized as one or more wireless communication media, one or more wireline communication media (e.g., coaxial cable, twisted pair of copper wires, powerline wiring, Ethernet cabling, optical fiber, etc.), or combinations thereof. Accordingly, the multicarrier apparatuses may include structure and functionality that enable signal communication over such media. Such structure and functionality may include one or more antennas, integrated wireline interfaces, and the like. Such structure and functionality may employ multiple differing wireline media (e.g., coaxial cable and powerline wiring). Depending on the implementation, the multicarrier apparatuses may communicate with one another directly (peer-to-peer mode) or the multicarrier apparatuses may communicate via the controller apparatus. The multicarrier apparatuses may be SISO and/or MIMO capable devices.

A family of networking standards called G.hn has been proposed by the International Telecommunication Union's Standardization arm (ITU-T) and promoted by the HomeGrid Forum. One or more of the G.hn specifications define networking over both wireline (e.g., powerlines, phone lines and coaxial cables) and wireless networks. The G.hn specifications specify standards by which multicarrier apparatuses may communicate via such communications channels. The techniques described herein may be employed with those G.hn specifications or other specifications.

Figure 5:
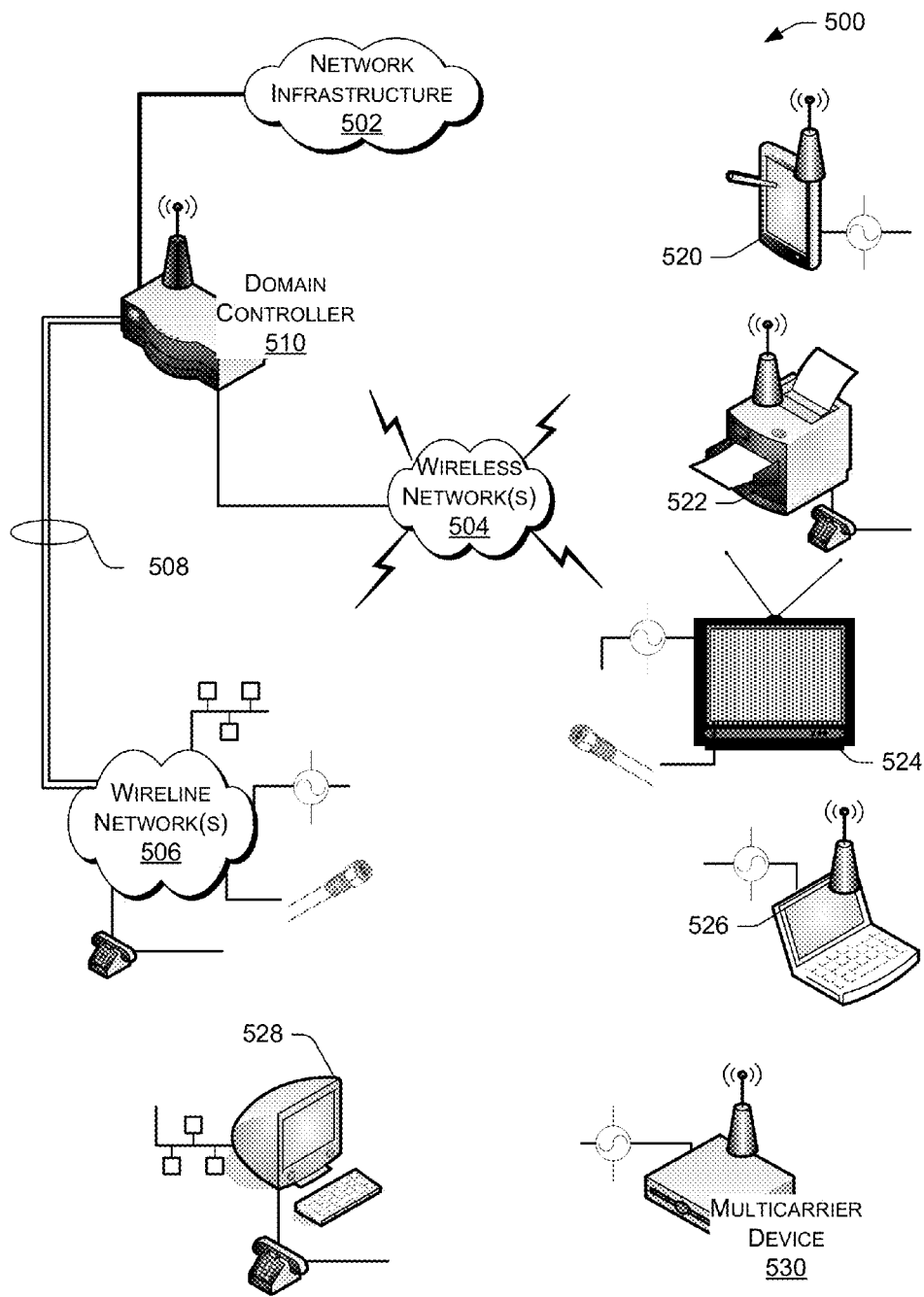
FIG. 5 shows an exemplary networking communications arrangement in which one or more implementations of the techniques described herein may be employed.

FIG. 5 shows an exemplary networking communications arrangement 500 in which one or more implementations may be employed. The multicarrier controller apparatus of the arrangement 500 is an access point 510 of a home networking environment. As shown in FIG. 5, the access point 510 may be a residential gateway that distributes broadband services from a connected network infrastructure 502 (e.g., the Internet) to various multicarrier apparatuses via one or more wireless networks 504 and one or more wireline networks 506. The wireless networks 504 may also be called wireless local area networks (WLAN) and the wireline networks 506 may be called local area networks (LANs).

The various multicarrier apparatuses depicted in FIG. 5 include a tablet computer 520, a network printer 522, a television 524, a laptop computer 526, a desktop computer 528, and a generic multicarrier apparatus or device 530 (e.g., a digital video recorder (DVR) and Internet TV device). The multicarrier apparatuses may be associated with digital content destinations in the home, but may also be associated with digital content sources, such as digital video recorders (DVR), computers providing streaming video, televisions, entertainment centers, and the like.

As depicted, the tablet computer 520 is configured to communicate via both wireless and powerline wireline networks, the network printer 522 is configured to communicate via wireless and/or twisted-pair cabling (e.g., telephone wiring) based wireline networks, the television 524 is configured to communicate via either of two different wireline networks (e.g., coaxial cabling and/or powerline cabling based), the laptop computer 526 communicates via powerline based wireline and/or wireless networks, and the desktop computer 528 is configured to communicate via an Ethernet cabling based wireline network and/or twisted-pair cabling (e.g., telephone wiring) based wireline networks. Similarly, the multicarrier device 530 is configured to communicate via wireless and/or powerline-based wireline networks. As depicted, the wireline networks 506 include one or more wireline networks based upon Ethernet cabling (e.g., Cat-5), powerline wiring, coaxial cabling, and/or telephone cabling. As represented by multiple wire connections 506, the domain controller 510 is connected via multiple different wirings to the multiple different wireline networks 506.

Furthermore, the multicarrier apparatuses may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit-rate Digital Subscriber Line (HDSL). In addition, some multicarrier apparatuses (such as 620, 622, 626, and 630) may be enabled to communicate using IEEE 802.11 and IEEE 802.16 (WiMAX) wireless technologies.

Signals exchanged between the multicarrier apparatuses may include multicarrier symbols that each include a plurality of tones or sub-channels. Each of the tones within a multicarrier symbol may have data bits modulated thereon that are intended for delivery from one of the multicarrier apparatuses to another.

Exemplary Network Device Employing Robust Preamble Techniques

Figure 6:
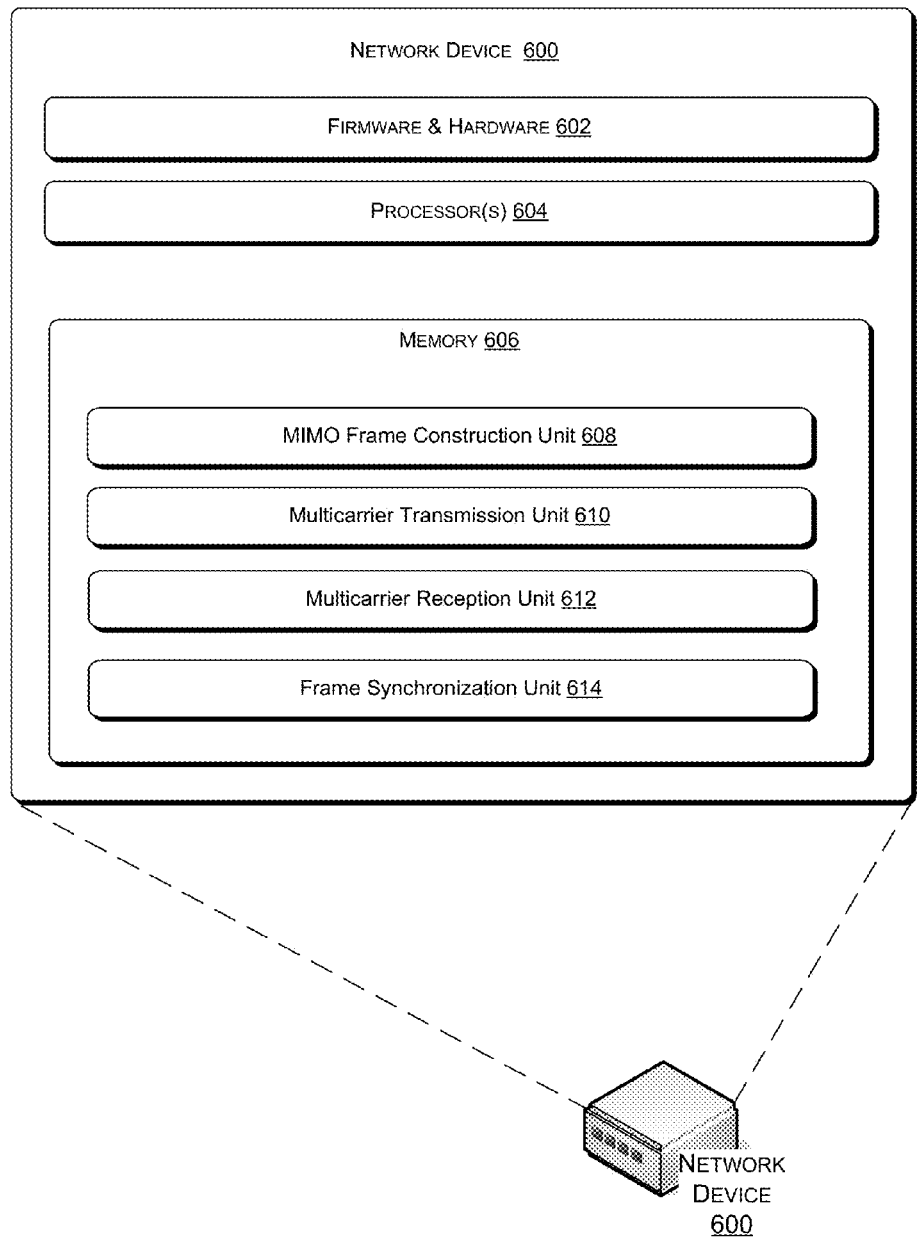
FIG. 6 illustrates an exemplary network device configured to implement the techniques described herein.

FIG. 6 shows an exemplary network device 600 configured to employ the implementations described herein. The network device 600 may be, for example, a network controller, a multicarrier controller apparatus (such as the access point 610 in FIG. 5), and/or a multicarrier apparatus (such as 520-530 of FIG. 5).

The network device 600 is depicted, in FIG. 6, in an expanded view to better show some of the relevant components therein. The network device 600 may include firmware & hardware 602, one or more processors 604, and a memory 606. The network device 600 has one or more modules of processor-executable instructions stored in the memory 606. The network device 600 may include a MIMO (and SISO) construction unit 608, a multicarrier transmission unit 610, a multicarrier reception unit 612, and a frame synchronization unit 614.

The MIMO frame construction unit 608 constructs a MIMO frame, at least in part, in accordance with one or more of the implementations described herein. When constructed, the MIMO frame may have at least two at least two data packets for transmission to one or more receivers.

The multicarrier transmission unit 610 is configured to transmit the MIMO frame over a communications medium. That communication medium may be a communication medium, such as a powerline. An OFDM transceiver is an example of a suitable device for the multicarrier transmission unit 610.

The multicarrier reception unit 612, such as the OFDM transceiver, receives a MIMO frame having a structure in accordance with at least one implementation described herein and via a communications medium, such as powerline.

The frame synchronization unit 614 monitors the incoming preambles of a MIMO frame. Based upon one or more preambles, the unit 614 calculates/predicts when the frame will start. The reception unit 612 can begin receiving the frame at the predicted time.

While the network device 600 is described herein in terms of modules and sub-modules of processor-executable instructions, the functionalities of these modules and sub-modules may be implemented in software, hardware, firmware, or a combination thereof.

Exemplary Processes

Figure 7:
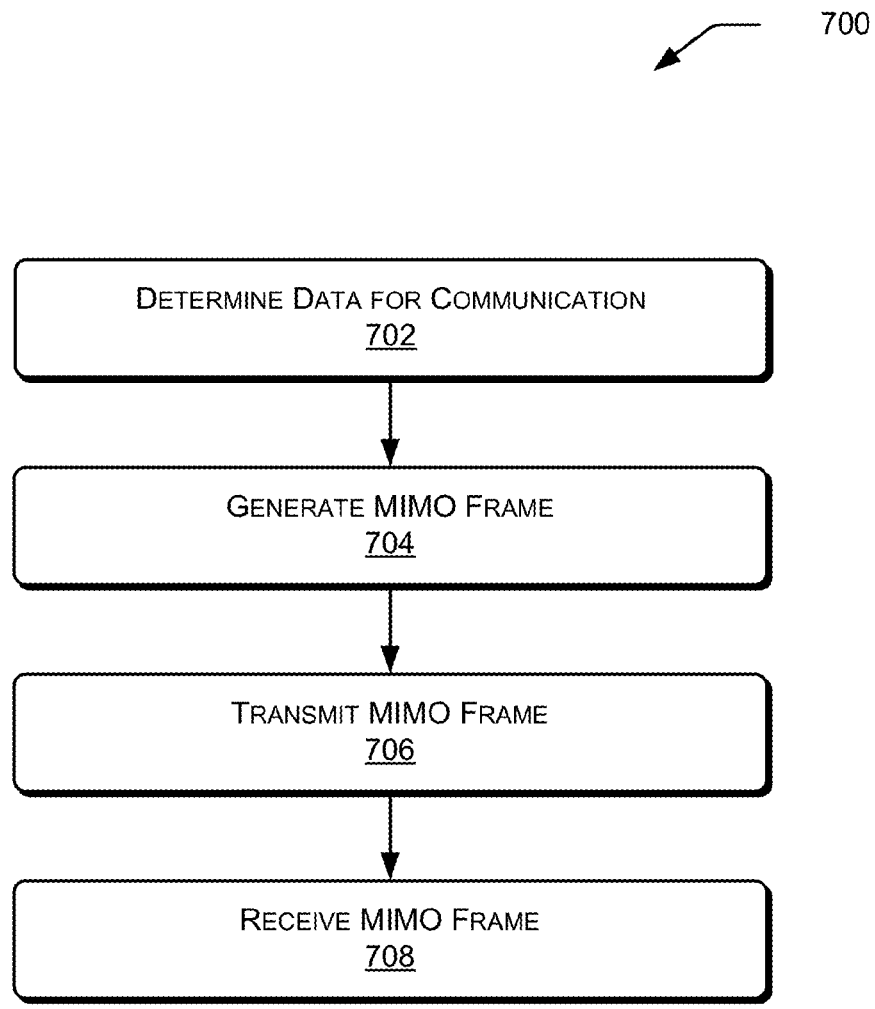
FIG. 7 is a flowchart of a process that is configured to implement the implementations described herein.

FIG. 7 is a flowchart illustrating an exemplary process 700 that implements the implementations described herein. The exemplary process 700 may be performed, at least in part, by a networking device such as a multicarrier controller apparatus (e.g., the domain controller 510 or television 524 of FIG. 5), a multicarrier apparatus (e.g., the device 530 of FIG. 5), and/or network device 600 of FIG. 6. Operation of the process 700 may reference previously introduced elements and description related to the drawing figures, such as FIGS. 1-6.

FIG. 7 includes process 700, which generates a MIMO frame in accordance with the implementations described herein. Typically, this process 700 is performed by a network device performing a multicarrier transmission over a communication medium, such as powerline.

At 702, the process 700 begins with determining that data are for communication to a receiver, such as a multicarrier device (e.g., network device 600).

At 704, the multicarrier device generates a MIMO frame in accordance with one of the implementations described herein. For example, the MIMO frame may generated as illustrated in FIGS. 3-4.

At 706, the multicarrier device transmits the MIMO frame generated at block 704 on a communication medium, such as powerline.

At 708, a multicarrier device receives the MIMO frame via the communication medium.

Additional and Alternative Implementation Notes

Exemplary implementations discussed herein may have various components collocated; however, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses or collocated on a particular node of a distributed network, such as a telecommunications network. Moreover, it should be understood that the components of the described arrangements may be arranged at any location within a distributed network without affecting the operation of the arrangements. Similarly, one or more functional portions of the arrangement may be distributed between a modem and an associated computing device.

The above-described implementations, arrangements, apparatuses and methods may be implemented in firmware, hardware, software, one or more software modules, one or more software and/or hardware testing modules, one or more telecommunications test devices, one or more DSL modems, one or more ADSL modems, one or more xDSL modems, one or more VDSL modems, one or more linecards, one or more G.hn transceivers, one or more MOCA transceivers, one or more Homeplug transceivers, one or more powerline modems, one or more wired or wireless modems, test equipment, one or more multicarrier transceivers, one or more wired and/or wireless wide/local area network systems, one or more satellite communication systems, network-based communication systems (such as an IP, Ethernet or ATM system), one or more modems equipped with diagnostic capabilities, or the like, or on one or more separate programmed general purpose computers having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the implementations, arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed implementations and procedures may be readily implemented in software using object or object-oriented software development environments that provide a portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on a programmed general-purpose computer with the cooperation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

The implementations herein are described in terms of exemplary embodiments. However, it should be appreciated that individual aspects of the implantations may be separately claimed and one or more of the features of the various embodiments may be combined. In the above description of exemplary implementations, for purposes of explanation, specific numbers, materials configurations, and other details are set fourth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Moreover, the described implementations may be similarly executed and realized by way of such hardware, software, firmware, or some combination thereof.

Note that the order in which the implementations and processes are described is not intended to be construed as a limitation, and any number of the described implementations and processes may be combined.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. An apparatus, comprising:
  a construction unit configured to construct:
    a packet including a first payload, the first payload having an associated first symbol, second symbol, third symbol, and fourth symbol, the first, second, third, and fourth symbols being consecutive, the first, second and third symbols including a common first section and second section, the first section of the second symbol shifted in relation to the first section of the first symbol and the second section of the second symbol shifted in relation to the second section of the first symbol, the first section of the third symbol shifted in relation to the first section of the first symbol and the first section of the second symbol, the second section of the third symbol shifted in relation to the second section of the first symbol and the second section of the second symbol;
    another packet including a second payload, the second payload having the associated first symbol, second symbol, third symbol, and fourth symbol, the first, second, third, and fourth symbols of the another packet being consecutive, the third symbol of the another packet including the first and second sections of the first symbol of the packet and the fourth symbol of the another packet including first and second sections of the second symbol of the packet; and
  a transmission unit configured to transmit the packets over a communication medium,
  wherein the packets are associated with a Multi-Input Multi-Output (MIMO) frame,
  wherein the transmission unit is configured to transmit the packet including the first payload via a first MIMO channel and to transmit the another packet including the second payload via a second MIMO channel.

2. The apparatus as recited in claim 1, wherein each of the packets further includes a preamble and a header.

3. The apparatus as recited in claim 1, wherein the common first section includes one or more bits of data and the common second section includes another one or more bits of data.

4. The apparatus as recited in claim 1, wherein the first symbol comprises a first plurality of symbols and the second symbol comprises a second plurality of symbols, the first and second plurality of symbols including common sections to carry data.

5. The apparatus as recited in claim 4, wherein the common sections of the second plurality of symbols are respectively shifted in relation to the common sections of the first plurality of symbols.

6. A method, comprising:
constructing:
  a packet including a first payload, the first payload having an associated first symbol, second symbol, third symbol, and fourth symbol, the first, second, and third symbols being consecutive and including a common first section and second section, the first section of the second symbol shifted in relation to the first section of the first symbol and the second section of the second symbol shifted in relation to the second section of the first symbol, the first section of the third symbol shifted in relation to the first section of the first symbol and the first section of the second symbol, the second section of the third symbol shifted in relation to the second section of the first symbol and the second section of the second symbol;
  another packet including a second payload, the second payload having the associated first symbol, second symbol, third symbol, and fourth symbol, the first, second, third, and fourth symbols of the another packet being consecutive, the third symbol of the another packet including the first and second sections of the first symbol of the packet and the fourth symbol of the another packet including first and second sections of the second symbol of the packet,
  wherein the constructing constructs a Multi-Input Multi-Output (MIMO) frame including the packets; and
  transmitting the packet including the first payload via a first MIMO channel and the another packet including the second payload via a second MIMO channel.

7. The method as recited in claim 6, wherein the transmitting transmits the frame at least in part by utilizing Orthogonal Frequency-Division Multiplexing (OFDM).

8. The method as recited in claim 6, wherein the constructing constructs the packets to each further include a preamble and a header.

9. The method as recited in claim 6, wherein the constructing constructs the common first section to include one or more bits of data and the common second section to include another one or more bits of data.

10. The method as recited in claim 6, wherein the constructing constructs the first symbol to comprise a first plurality of symbols and the second symbol to comprise a second plurality of symbols, the first and second plurality of symbols including common sections to carry data.

11. The method as recited in claim 10, wherein the common sections of the second plurality of symbols are respectively shifted in relation to the common sections of the first plurality of symbols.

12. A non-transitory computer-readable media storing processor-executable instructions that, when executed, cause one or more processors to perform operations that facilitate successful reception of frame via a communication medium, the operations comprising:
  receiving a Multi-Input Multi-Output (MIMO) frame, wherein the frame includes:
    a packet including a first payload, the first payload having an associated first symbol, second symbol, third symbol, and fourth symbol, the first, second, and third symbols being consecutive and including a common first section and second section, the first section of the second symbol shifted in relation to the first section of the first symbol and the second section of the second symbol shifted in relation to the second section of the first symbol, the first section of the third symbol shifted in relation to the first section of the first symbol and the first section of the second symbol, the second section of the third symbol shifted in relation to the second section of the first symbol and the second section of the second symbol;
    another packet including a second payload, the second payload having the associated first symbol, second symbol, third symbol, and fourth symbol, the first, second, third, and fourth symbols being consecutive, the third symbol of the another packet including the first and second sections of the first symbol of the packet and the fourth symbol of the another packet including first and second sections of the second symbol of the packet,
    wherein the packet including the first payload is received via a first MIMO channel and wherein the another packet including the second payload is received via a second MIMO channel.

13. The non-transitory computer-readable media as recited in claim 12, wherein a preamble and a header precede each of the packets.

14. The non-transitory computer-readable media as recited in claim 12, wherein the receiving is performed at least in part by utilizing Orthogonal Frequency-Division Multiplexing (OFDM).

15. The non-transitory computer-readable media as recited in claim 12, wherein the common first section includes one or more bits of data and the common second section includes another one or more bits of data.

16. The non-transitory computer-readable media as recited in claim 12, wherein the first symbol comprises a first plurality of symbols and the second symbol comprises a second plurality of symbols, the first and second plurality of symbols including common sections to carry data.

* * * * *